(12) United States Patent
Song et al.

(10) Patent No.: US 9,146,604 B2
(45) Date of Patent: Sep. 29, 2015

(54) POWER CONTROL APPARATUS AND POWER CONTROL METHOD

(75) Inventors: Jonghwa Song, Seoul (KR); Jongsoo Park, Seoul (KR); Jongho Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 457 days.

(21) Appl. No.: 12/970,375

(22) Filed: Dec. 16, 2010

(65) Prior Publication Data

US 2012/0158204 A1  Jun. 21, 2012

(51) Int. Cl.
*G06F 1/32* (2006.01)
*H02J 3/14* (2006.01)

(52) U.S. Cl.
CPC ............... *G06F 1/3206* (2013.01); *H02J 3/14* (2013.01)

(58) Field of Classification Search
None
See application file for complete search history.

(56) References Cited

U.S. PATENT DOCUMENTS

| | | | | |
|---|---|---|---|---|
| 4,998,024 | A * | 3/1991 | Kirk et al. .................. | 307/40 |
| 5,430,430 | A * | 7/1995 | Gilbert ..................... | 340/870.02 |
| 5,924,486 | A * | 7/1999 | Ehlers et al. ................ | 165/238 |
| 6,665,805 | B1 * | 12/2003 | Tsirkel et al. ............... | 713/323 |
| 6,853,291 | B1 * | 2/2005 | Aisa ......................... | 340/3.3 |
| 7,110,832 | B2 * | 9/2006 | Ghent ........................ | 700/16 |
| 7,219,243 | B2 * | 5/2007 | Lim .......................... | 713/320 |
| 7,420,293 | B2 * | 9/2008 | Donnelly et al. ............. | 307/34 |
| 8,099,195 | B2 * | 1/2012 | Imes et al. .................. | 700/278 |
| 8,185,245 | B2 * | 5/2012 | Amundson et al. .......... | 700/277 |
| 8,195,337 | B2 * | 6/2012 | Cruickshank, III ......... | 700/286 |
| 8,204,628 | B2 * | 6/2012 | Schnell et al. .............. | 700/278 |
| 8,275,471 | B2 * | 9/2012 | Huizenga et al. ........... | 700/22 |
| 8,326,466 | B2 * | 12/2012 | Peterson .................... | 700/276 |
| 2004/0073827 | A1 * | 4/2004 | Tsirkel et al. ............... | 713/323 |
| 2004/0098171 | A1 * | 5/2004 | Horst ........................ | 700/295 |
| 2007/0043478 | A1 * | 2/2007 | Ehlers et al. ............... | 700/276 |
| 2007/0271006 | A1 * | 11/2007 | Golden et al. ............. | 700/295 |
| 2009/0088907 | A1 * | 4/2009 | Lewis et al. ............... | 700/286 |
| 2009/0198384 | A1 | 8/2009 | Ahn | |
| 2009/0240380 | A1 * | 9/2009 | Shah et al. ................. | 700/295 |

(Continued)

FOREIGN PATENT DOCUMENTS

| | | |
|---|---|---|
| JP | 2001-169028 A | 6/2001 |
| KR | 10-2006-0039335 A | 5/2006 |

(Continued)

OTHER PUBLICATIONS

Moshnyaga, V.G., A New Approach for Energy Management in User-Centric Applications, 2010 International Green Computing Conference, Aug. 15-18, 2010, pp. 107-112.*

(Continued)

*Primary Examiner* — Darrin Dunn
*Assistant Examiner* — Christopher E Everett
(74) *Attorney, Agent, or Firm* — Birch, Stewart, Kolasch & Birch, LLP

(57) ABSTRACT

The electric apparatus using electric power of the present invention includes a communication unit for receiving power information including electric rate information or power demand information on each of time zones from an outside of the electric apparatus, a timer for determining a user unused time period in which a user does not use the electric apparatus during operation of the electric apparatus, and a control unit for shifting the electric apparatus to a power saving mode with reference to the power information received through the communication unit, and the user unused time period determined by the timer.

10 Claims, 10 Drawing Sheets

(56) References Cited

U.S. PATENT DOCUMENTS

| | | | |
|---|---|---|---|
| 2010/0005325 A1* | 1/2010 | Ouyang et al. | 713/310 |
| 2010/0174668 A1* | 7/2010 | Finch et al. | 705/412 |
| 2010/0179708 A1* | 7/2010 | Watson et al. | 700/296 |
| 2011/0098869 A1* | 4/2011 | Seo et al. | 700/296 |
| 2011/0114627 A1* | 5/2011 | Burt | 219/396 |
| 2011/0148390 A1* | 6/2011 | Burt et al. | 323/318 |
| 2011/0153109 A1* | 6/2011 | Drake et al. | 700/296 |
| 2011/0153110 A1* | 6/2011 | Drake et al. | 700/296 |
| 2011/0175742 A1* | 7/2011 | Shin et al. | 340/635 |
| 2011/0196547 A1* | 8/2011 | Park et al. | 700/296 |
| 2011/0270452 A1* | 11/2011 | Lu et al. | 700/291 |
| 2012/0101637 A1* | 4/2012 | Imes et al. | 700/278 |
| 2012/0109395 A1* | 5/2012 | Finch et al. | 700/295 |
| 2012/0226767 A1* | 9/2012 | Luna et al. | 709/216 |

FOREIGN PATENT DOCUMENTS

| | | |
|---|---|---|
| KR | 10-2010-0018444 A | 2/2010 |
| KR | 10-0960503 B1 | 6/2010 |

OTHER PUBLICATIONS

Energy Star Building Manual, Chapter 7. Reducing Supplemental Loads, Aug. 2007, pp. 1-18.*

* cited by examiner

FIG. 6

| Electric rate | Mode shifting reference time period |
|---|---|
| Low | 30 Minutes |
| Middle | 15 Minutes |
| High | 5 Minutes |

FIG. 7

| Time | Before SG(Wh) | After SG | | | | | | Electric rate level | Management mode |
|---|---|---|---|---|---|---|---|---|---|
| | | Without mode shifting | | | With mode shifting | | | | |
| | | Power consumption(Wh) | Electric rate (Won/kWh) | Hourly electric rate (Won) | Power consumption(Wh) | Electric rate (Won/kWh) | Hourly electric rate (Won) | | |
| 0 | 5.40 | 5.40 | 80 | 0.432 | 2.40 | 80 | 0.192 | Low | |
| 1 | 5.40 | 5.40 | 80 | 0.432 | 2.40 | 80 | 0.192 | Low | |
| 2 | 5.40 | 5.40 | 80 | 0.432 | 2.40 | 80 | 0.192 | Low | Saving mode: 1h |
| 3 | 5.40 | 5.40 | 80 | 0.432 | 2.40 | 80 | 0.192 | Low | |
| 4 | 5.40 | 5.40 | 80 | 0.432 | 2.40 | 80 | 0.192 | Low | |
| 5 | 5.40 | 5.40 | 80 | 0.432 | 2.40 | 80 | 0.192 | Low | |
| 6 | 5.40 | 5.40 | 80 | 0.432 | 2.40 | 80 | 0.192 | Low | |
| 7 | 5.40 | 5.40 | 250 | 1.350 | 3.15 | 250 | 0.788 | Middle | |
| 8 | 5.40 | 5.40 | 250 | 1.350 | 3.15 | 250 | 0.788 | Middle | Saving mode: 45m |
| 9 | 5.40 | 5.40 | 250 | 1.350 | 3.15 | 250 | 0.788 | Middle | General mode: 15m |
| 10 | 5.40 | 5.40 | 250 | 1.350 | 3.15 | 250 | 0.788 | Middle | |
| 11 | 5.40 | 5.40 | 400 | 2.160 | 2.65 | 400 | 1.060 | High | |
| 12 | 5.40 | 5.40 | 400 | 2.160 | 2.65 | 400 | 1.060 | High | Saving mode: 55m |
| 13 | 5.40 | 5.40 | 400 | 2.160 | 2.65 | 400 | 1.060 | High | General mode: 5m |
| 14 | 5.40 | 5.40 | 400 | 2.160 | 2.65 | 400 | 1.060 | High | |
| 15 | 5.40 | 5.40 | 400 | 2.160 | 2.65 | 400 | 1.060 | High | |
| 16 | 5.40 | 5.40 | 400 | 2.160 | 2.65 | 400 | 1.060 | High | |
| 17 | 5.40 | 5.40 | 250 | 1.350 | 3.15 | 250 | 0.788 | Middle | |
| 18 | 5.40 | 5.40 | 250 | 1.350 | 3.15 | 250 | 0.788 | Middle | Saving mode: 45m |
| 19 | 5.40 | 5.40 | 250 | 1.350 | 3.15 | 250 | 0.788 | Middle | General mode: 15m |
| 20 | 5.40 | 5.40 | 250 | 1.350 | 3.15 | 250 | 0.788 | Middle | |
| 21 | 5.40 | 5.40 | 250 | 1.350 | 3.15 | 250 | 0.788 | Middle | |
| 22 | 5.40 | 5.40 | 80 | 0.432 | 3.90 | 80 | 0.312 | Low | Saving mode: 30m |
| 23 | 5.40 | 5.40 | 80 | 0.432 | 3.90 | 80 | 0.312 | Low | General mode: 30m |
| Daily sum | 129.60 | 129.60 | | 28.998 | 68.85 | | 15.4155 | | |
| Monthly sum(kWh) | 3.888 | 3.888 | | 869.94 | 2.0655 | | 462.465 | | |
| Monthly electric bill (Won) | | | | | | | | | |
| CO2 Emission (kg) | 1.65 | 1.65 | | | 0.88 | | | 0.424kg/kWh | |

FIG. 9

| Electric rate | Mode shifting reference time period | Automatic cut off reference time period |
|---|---|---|
| Low | 30 Minutes | 1 Hour |
| Middle | 15 Minutes | 30 Minutes |
| High | 5 Minutes | 10 Minutes |

FIG. 10

| Time | Before SG(Wh) | After SG | | | | | | |
|---|---|---|---|---|---|---|---|---|
| | | Without mode shifting | | | With mode shifting | | Electric rate level | Management mode |
| | | Power consumption(Wh) | Electric rate (Won/kWh) | Hourly electric rate (Won) | Power consumption(Wh) | Electric rate (Won/kWh) | Hourly electric rate (Won) | |
| 0 | 192.00 | 192.00 | 80 | 15.360 | 0.00 | 80 | 0.000 | Low | Cut off mode: 1h |
| 1 | 192.00 | 192.00 | 80 | 15.360 | 0.00 | 80 | 0.000 | | |
| 2 | 192.00 | 192.00 | 80 | 15.360 | 0.00 | 80 | 0.000 | | |
| 3 | 192.00 | 192.00 | 80 | 15.360 | 0.00 | 80 | 0.000 | | |
| 4 | 192.00 | 192.00 | 80 | 15.360 | 0.00 | 80 | 0.000 | | |
| 5 | 192.00 | 192.00 | 80 | 15.360 | 0.00 | 80 | 0.000 | | |
| 6 | 192.00 | 192.00 | 80 | 15.360 | 0.00 | 80 | 0.000 | | |
| 7 | 192.00 | 192.00 | 250 | 48.000 | 72.00 | 250 | 18.000 | Middle | Cut off mode: 30m / Saving mode: 15m / General mode: 15m |
| 8 | 192.00 | 192.00 | 250 | 48.000 | 72.00 | 250 | 18.000 | | |
| 9 | 192.00 | 192.00 | 250 | 48.000 | 72.00 | 250 | 18.000 | | |
| 10 | 192.00 | 192.00 | 250 | 48.000 | 72.00 | 250 | 18.000 | | |
| 11 | 192.00 | 192.00 | 400 | 76.800 | 24.00 | 400 | 9.600 | High | Cut off mode: 30m / Saving mode: 5m / General mode: 5m |
| 12 | 192.00 | 192.00 | 400 | 76.800 | 24.00 | 400 | 9.600 | | |
| 13 | 192.00 | 192.00 | 400 | 76.800 | 24.00 | 400 | 9.600 | | |
| 14 | 192.00 | 192.00 | 400 | 76.800 | 24.00 | 400 | 9.600 | | |
| 15 | 192.00 | 192.00 | 400 | 76.800 | 24.00 | 400 | 9.600 | | |
| 16 | 192.00 | 192.00 | 250 | 48.000 | 72.00 | 250 | 18.000 | Middle | Cut off mode: 30m / Saving mode: 15m / General mode: 15m |
| 17 | 192.00 | 192.00 | 250 | 48.000 | 72.00 | 250 | 18.000 | | |
| 18 | 192.00 | 192.00 | 250 | 48.000 | 72.00 | 250 | 18.000 | | |
| 19 | 192.00 | 192.00 | 250 | 48.000 | 72.00 | 250 | 18.000 | | |
| 20 | 192.00 | 192.00 | 250 | 48.000 | 72.00 | 250 | 18.000 | | |
| 21 | 192.00 | 192.00 | 250 | 48.000 | 72.00 | 250 | 18.000 | | |
| 22 | 192.00 | 192.00 | 80 | 15.360 | 144.00 | 80 | 11.52 | Low | Saving mode: 30m / General mode: 30m |
| 23 | 192.00 | 192.00 | 80 | 15.360 | 144.00 | 80 | 11.52 | | |
| Daily sum | 4608.00 | 4608 | | 1031.04 | 1080 | | 242.64 | | |
| Monthly sum (kWh) | 138.24 | 138.24 | | | 32.4 | | | | |
| Monthly electric bill (Won) | | | | 30931.2 | | | 7279.2 | | |
| CO2 Emission (kg) | 58.61 | 58.61 | | | 13.74 | | | 0.424kg/kWh | |

POWER CONTROL APPARATUS AND POWER CONTROL METHOD

BACKGROUND OF THE DISCLOSURE

1. Field of the Disclosure

The present invention relates to a power control apparatus and a power control method, and more particularly to a power control apparatus and a power control method for reducing power consumption of electric apparatuses in conformity with electric rate which varies with time zones.

2. Discussion of the Related Art

Presently, an electric power system has been designed to produce power about 10% greater than power to be used actually. This power is designed to meet maximum power consumption for securing power in advance in preparation for a case the power is used greater than the design. Consequently, the present electric power system requires not only fuel, but also various power generating facilities, additionally. And, since there has been much waste of electricity, the electric power system has poor energy efficiency, and increased emission of carbon dioxide in a process of burning coal, petroleum, or gas.

If the electricity may be produced exactly as much as required, or the electricity may be used to meet a produced quantity, the electricity will be used more efficiently while preventing global warming from taking place. A smart grid is a technology in which an electric power network is combined with an information communication technology to make power consumption, supply, and even a state of power line known for maximizing energy efficiency.

The smart gird enables real time exchange of information between consumers and an electric power company by combining information communication technology, such as Zigbee and power line communication, with the electric power network, enabling the consumer to use the electricity when the electric rate is low, and also to put the electric apparatuses into operation automatically in a time zone in which the electric rate is low.

In this case, since the electric power company may make real time grasp of the present power consumption in a position of an electric power producer, the electric power company may make flexible control of a power supply rate. The electric power company may make flexible management in which maximum wattage is not maintained in a time zone when use of power is low, surplus power is used for pumped-storage power generation to reduce waste of electricity, and electricity is stored to supply the electricity at a time zone when use of the power is great. Moreover, failure of the electric power network caused by overload may be prevented.

In conclusion, the smart grid is a system which manages all things through which electricity flows, starting from electric products, such as a TV set, a refrigerator, and so on used domestically, even to industrial equipment running in factories, in a bundle, efficiently. The smart grid enables the user to make real time notice of electric rate the user used at anywhere, such as home, office and factory, and to use the electricity while avoiding a time zone in which the electric rate is high.

SUMMARY OF THE DISCLOSURE

Accordingly, the present invention is directed to a power control apparatus and a power control method.

An object of the present invention is to provide a power control apparatus and a power control method, in which a smart grid is used for reducing power consumption of electric apparatuses in conformity with electric rate which varies with time zones.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electric apparatus using electric power includes a communication unit for receiving power information including electric rate information or power demand information on each of time zones from an outside of the electric apparatus, a timer for determining a user unused time period in which a user does not use the electric apparatus during operation of the electric apparatus, and a control unit for shifting the electric apparatus to a power saving mode with reference to the power information received through the communication unit, and the user unused time period determined by the timer.

The communication unit may receive information on use of the electric apparatus and forwards the information to the timer, and receive a mode shifting order on the electric apparatus from the control unit and forwards the mode shifting order to the electric apparatus. In this instance, the electric apparatus may further include a memory for receiving the power information from the communication unit and storing the power information therein.

The control unit may control to vary a mode shifting reference time period in which the electric apparatus is shifted to the power saving mode with reference to the power information.

In this instance, the electric apparatus may further include an input unit for receiving user's order on setting of the mode shifting reference time period and forwarding the user's order to the control unit, and the control unit compares the mode shifting reference time period from the input unit to the user unused time period.

In this instance, the control unit may set the mode shifting reference time period to the electric apparatus such that the electric apparatus is shifted to the power saving mode within a relatively short user unused time period in a time zone in which a relatively high electric rate is applied.

In the meantime, the timer may determine the user unused time period by determining a user's final handling time on the electric apparatus, and calculating a time period passed from the final handling time period. In this instance, the electric apparatus may include a smart meter, a computer, a refrigerator, and a washing machine.

In the meantime, the timer may determine presence of the user to the electric apparatus by using a sensor to determine a final time of use on the electric apparatus, and may calculate a time period passed from the final time of use to determine the user unused time period. In this instance, the control unit may set a cut off shifting reference time period in which the electric apparatus is shifted from the power saving mode to the power cut off mode automatically with reference to the power information, and may control the electric apparatus to cut off the power to the electric apparatus, if the user unused time period is greater than or equal to the cut off shifting reference time period. In this instance, the electric apparatus may include a TV set, a lighting apparatus, and an air conditioner.

In another aspect of the present invention, a method for controlling power includes the steps of receiving power information including electric rate information or power demand information on each of time zones from an outside of the electric apparatus, determining a user unused time period in which a user does not handle or use the electric apparatus during operation of the electric apparatus, and shifting the electric apparatus to a power saving mode with reference to the power information received, and the user unused time period.

In this instance, the step of shifting the electric apparatus to a power saving mode may include the steps of receiving a user's order on setting of the mode shifting reference time period in which the electric apparatus is to be shifted to the power saving mode, and variably setting the mode shifting reference time period according to the user's order.

The step of variably setting the mode shifting reference time period may include the step of setting the mode shifting reference time period to the electric apparatus such that the electric apparatus is shifted to the power saving mode within a relatively short user unused time period in a time zone in which relatively high electric rate is applied.

The step of determining a user unused time period may include the steps of determining the user unused time period by determining a user's final handling time on the electric apparatus, and calculating a time period passed from the final handling time period. In this instance, the electric apparatus may include a smart meter, a computer, a refrigerator, and a washing machine.

The step of determining a user unused time period may include the steps of determining presence of the user to the electric apparatus by using a sensor to determine a final time of use on the electric apparatus, and calculating a time period passed from the final time of use to determine the user unused time period. In this instance, the method may further include the steps of setting a cut off shifting reference time period in which the electric apparatus is shifted from the power saving mode to the power cut off mode automatically with reference to the power information, and controlling the electric apparatus to cut off the power to the electric apparatus, if the user unused time period is greater than or equal to the cut off shifting reference time period. In this instance, the electric apparatus may include a TV set, a lighting apparatus, and an air conditioner.

Thus, the power control apparatus and the power control method of the present invention have the following advantages.

Unnecessary power consumption by the electric apparatuses may be prevented.

And, the refraining of power consumption in time zones in which high electric rate is charged permits the user to save the electric charge.

Moreover, the suppressing of the power consumption in time zones in which the power consumption is high permits the power provider to reduce additional installation of power facilities.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 illustrates a table showing a mode shifting reference time period with reference to electric rate level in the first exemplary embodiment of the present invention as an example.

FIG. 7 illustrates a table showing saving effects of power consumption and electric rate owing to a method for controlling power in accordance with a first exemplary embodiment of the present invention as an example.

FIG. 9 illustrates a table showing a mode shifting reference time period and a cut off shifting reference time period with reference to electric rate level in the second exemplary embodiment of the present invention as an example.

FIG. 10 illustrates a table showing saving effects of power consumption and electric rate owing to a method for controlling power in accordance with a first exemplary embodiment of the present invention as an example.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
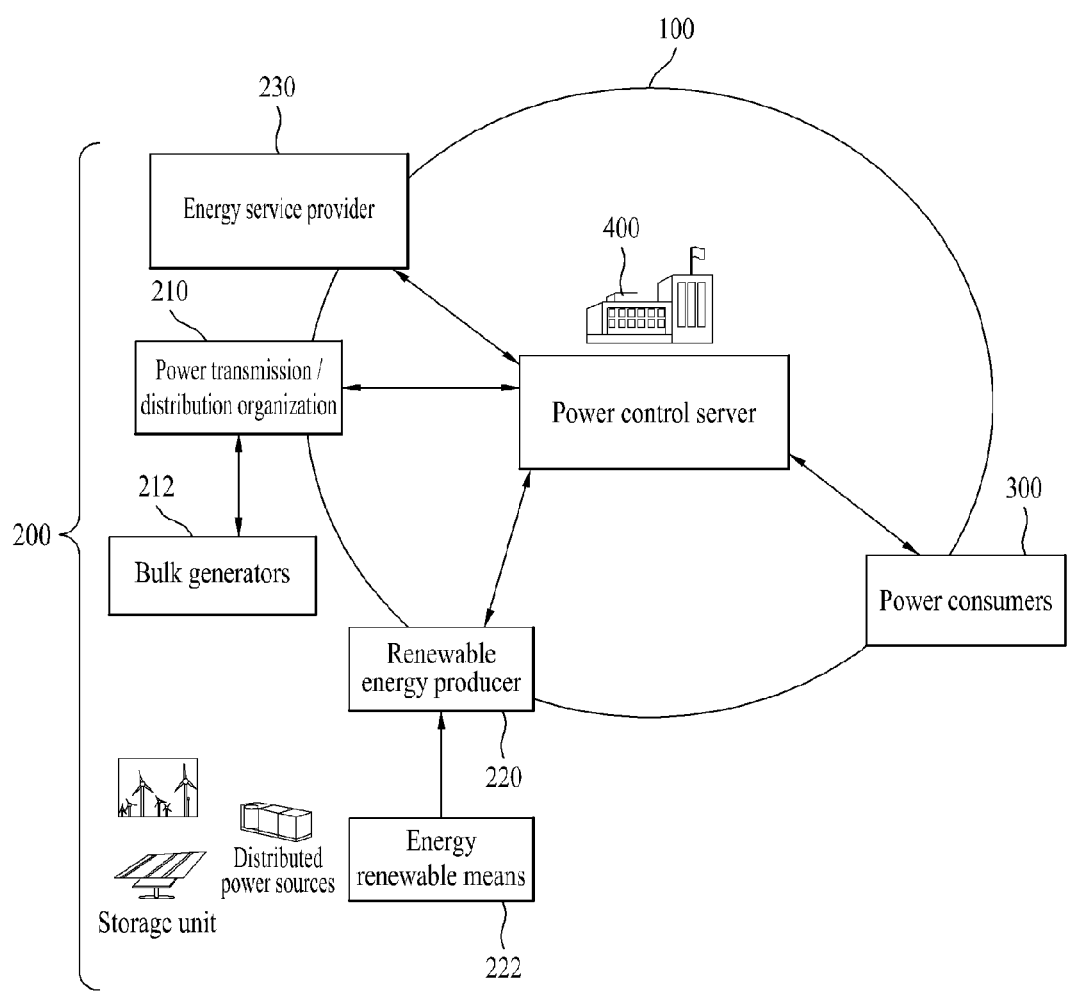
FIG. 1 illustrates a schematic view of an electric power control system in accordance with an exemplary embodiment of the present invention, schematically.

FIG. 1 illustrates a schematic view of an electric power control system in accordance with an exemplary embodiment of the present invention, schematically. As shown in FIG. 1, connected to a power information network 100 of the power control system, there are power suppliers 200 who supply power to power consumers 300, and the power consumers 300 who consume the power supplied by the power suppliers 200. The power information network 100 also has a power control server 400 connected thereto for controlling the power suppliers 200 and the power consumption of the power consumers 300, for making real time exchange of information.

The power suppliers 200, the power consumers 300, and the power control server 400 may be individual and independent organizations, or depending on necessity, one organization which performs duplicated functions. And, within the power information network 100, there may be a plurality of power suppliers 200, a plurality of power consumers 300, and a plurality of power control servers 400.

The power supplier 200 connected to the power information network 100 includes power transmission/distribution organization 210, a renewable energy producer 220, and an energy service provider 230.

The energy service provider 230 provides power information to the power consumers 300 and the power control server 400 through the power information network 100. The power information provided from the energy service provider 230 may include power demand information and electric rate information, which will be described, later.

The power transmission/distribution organization 210 and the renewable energy producer 220 serve as energy sources which provide power through the power information network 100. For an example, the power transmission/distribution organization 210 includes bulk generators 212 who are in charge of primary power supply. And, the renewable energy producer 220 includes an energy renewable means 222 which includes storage units and distributed power sources.

The power consumer 300 connected to the power information network 100 may include all facilities, such as residential buildings, office buildings, and factories which require electric power having the smart grid function applied thereto. The power consumer 300 has a power control apparatus installed thereto for controlling use of power of a plurality of electric apparatuses provided in the power consumer 300. Hereinafter, the electric apparatuses denote not only home appliances used domestically, such as refrigerators, air conditioners, and fans, but also digital multimedia instruments, such as TV sets, Audio sets, DVD players, and cellular phones, which consume electricity. The residential building in which various electric apparatuses are used will be described as an example of the power consumer 300.

Figure 2:
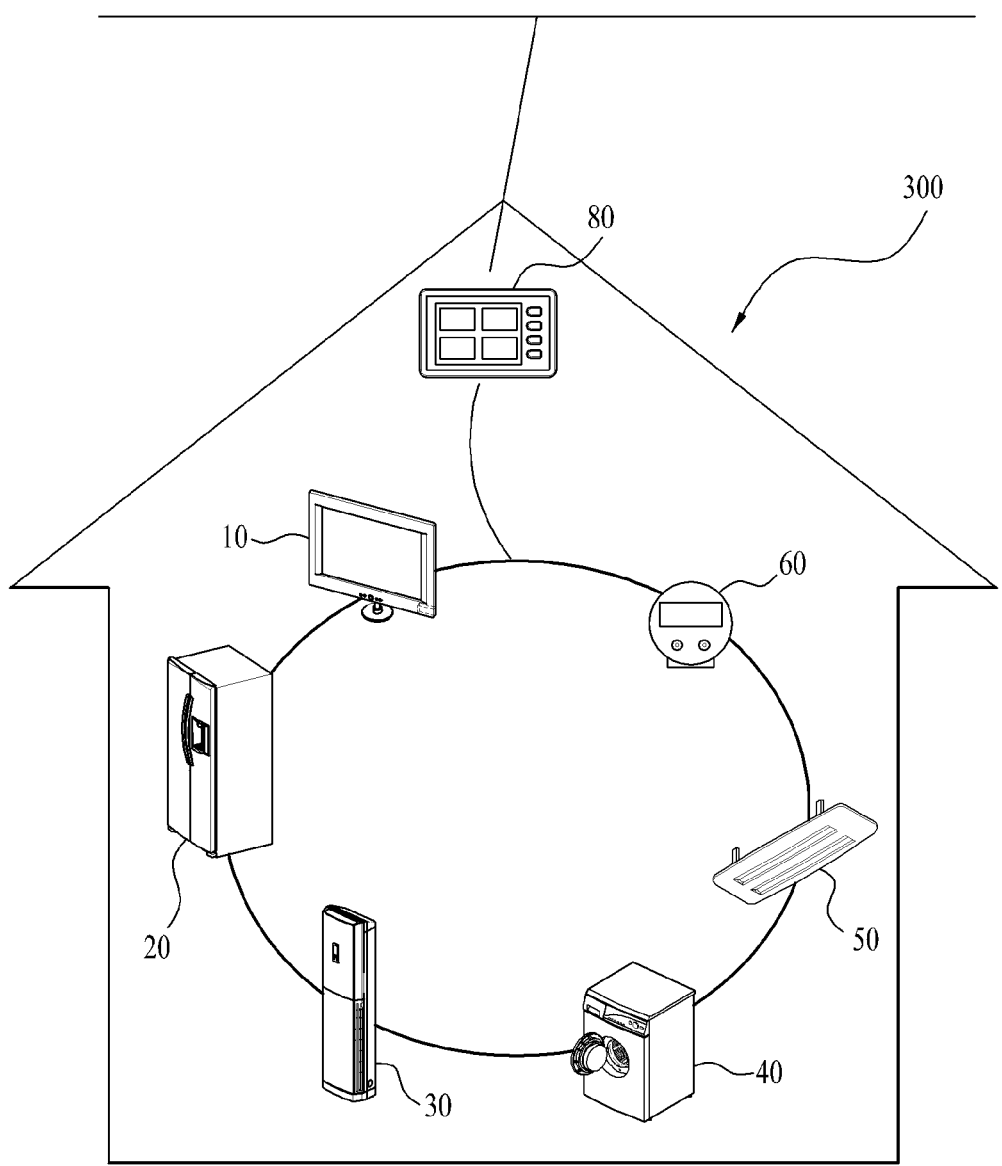
FIG. 2 illustrates a schematic view of electric apparatuses in the electricity consumer in FIG. 1.

FIG. 2 illustrates a schematic view of electric apparatuses in the electricity consumer 300 of which power is set to be controllable by using the smart grid. As shown, in the power consumer 300, there may be different electric apparatuses, such as a TV set 10, a refrigerator 20, an air conditioner 30, a washing machine 40, and a lighting apparatus 50.

Moreover, the power consumer 300 may have a smart meter 60 which is an electronic wattage-hour meter having functions for making real time measurement of power consumption of the power consumer 300 in each of time zones and transmitting information thereon, enabling the user to know the power consumption or electric rate in each of the time zones. The smart meter 60 is provided with a display unit for enabling the user to make real time checking of the power consumption, and either-way communication between the power suppliers and the user.

The power consumer 300 may be connected to the power information network 100 with one or a combination of a gateway, a power line communication PLC, near field communication NFC, 3G (3 Generation), and 4G (4 Generation). The power consumer 300 constructs a communication network among various electric apparatuses with a home network of its own. And, the power consumer 300 receives a plurality pieces of information from the power information network 100 through the power control apparatus 80 provided therein and provides the information to the user.

The power control apparatus 80 of the present invention has a function for controlling use of power of other electric apparatuses in the power consumer 300. Particularly, the power control apparatus 80 carries out power control such that power control apparatus 80 receives power information including electric rate information and power demand information which vary with time zones through the power information network 100, reduces power consumption of the electric apparatuses, and saves the electric charge.

A function of the power control apparatus 80 described below may be embodied by a smart server provided in the power consumer 300. Moreover, the function of the power control apparatus 80 may be embodied by different apparatuses, such as a smart TV, and a smart phone, which may access to the electric apparatuses and the power information network 100 and perform communication and control functions. Furthermore, the power control apparatus 80 may be embodied in a mode in which the power control apparatus 80 is included to each of individual electric apparatuses. A configuration of the power control apparatus 80 will be described in detail.

Figure 3:
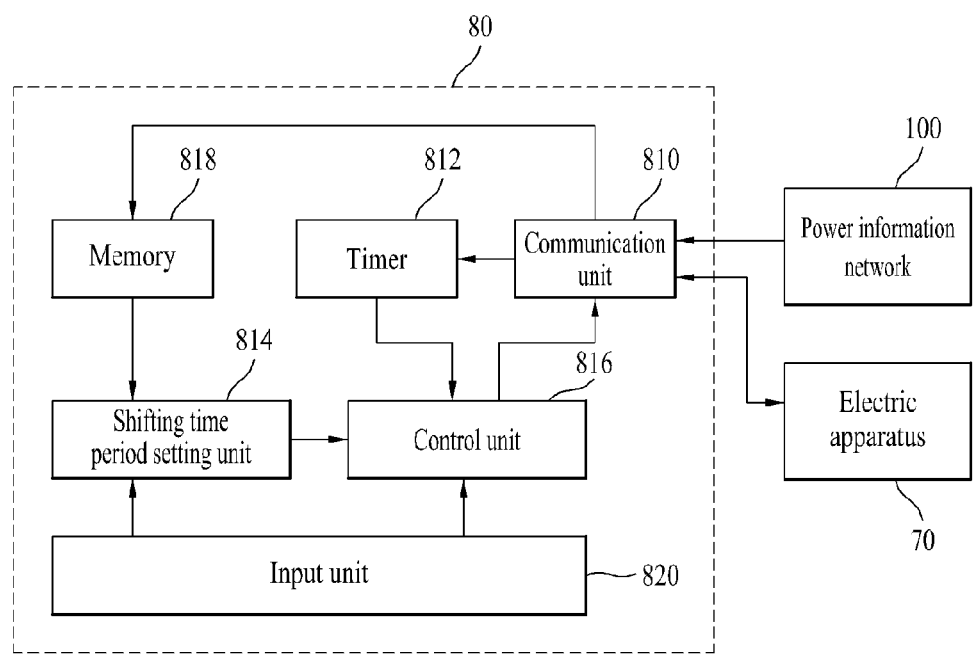
FIG. 3 illustrates a block diagram of a power control apparatus in accordance with an exemplary embodiment of the present invention.

FIG. 3 illustrates a block diagram of the power control apparatus 80 in accordance with an exemplary embodiment of the present invention. As shown in FIG. 3, the power control apparatus 80 includes a communication unit 810, a timer 812, a shifting time period setting unit 814, a control unit 816, a memory 818, and an input unit 820.

However, the power control apparatus 80 shown in FIG. 3 is exemplary, and the present invention is not limited to this. Moreover, each of elements of the power control apparatus 80 may be constructed of hardware, software, firmware, and a combination of those, integration of a plurality of the elements, or functional division of one of the elements.

Particularly, though the timer 812, the shifting time period setting unit 814, and the control unit 816 are described as individual elements, the timer 812 and the shifting time period setting unit 814 may be hardware or software included to the control unit 816, with functions thereof performed by the control unit 816, collectively.

The communication unit 810 is configured to receive and transmit information from/to an outside of the power control apparatus 80 with or without wire. Particularly, the communication unit 810 receives information on use of the electric apparatuses 70 from the electric apparatuses 70 and forwards the information to the timer 812, and receives the power information including electric rate information and power demand information from the power information network 100, and forwards the power information to the shifting time period setting unit 814 and the memory 818.

In addition, the communication unit 810 receives a mode shift order on the electric apparatus 70 from the control unit 816 and forwards to the same to the electric apparatus 70. Moreover, as one embodiment of the present invention, the elements of the power control apparatus 80 shown in FIG. 3 may be built in each of the electric apparatuses 70 separate from the power control apparatus 80 which controls domestic appliances, to enable each of the electric apparatuses 70 to be able to make a mode control for saving power, individually.

The communication unit 810 which performs above functions may be, for an example, a Zigbee standard module. However, the present invention is not limited to this, but the communication unit 810 may be other communication module different from above.

The timer 812 determines a user unused time period in which the user does not use the electric apparatus 70 during operation of the electric apparatus 70 with reference to information on use of the electric apparatus 70 received from the communication unit 810. For an example, in a case the electric apparatus 70 is a refrigerator, a washing machine, a smart meter, and a computer, the timer 812 determines a time when the user handles the electric apparatus 70 for change of setting thereof finally, and calculates a time period from the time to produce information on the user unused time period on the electric apparatus 70.

And, in a case of a particular electric apparatus 70, such as the TV set, the lighting apparatus, and the air conditioner, if presence of the user to the electric apparatus 70 is determined by a sensor provided to the electric apparatus 70, by calculating a time period starting from a user non-presence time, the timer 812 may produce the information on the user unused time period on the electric apparatus 70. The timer 812 forwards the information on the user unused time period on the electric apparatus 70 produced thus to the control unit 816. The user's use of the electric apparatus 70 may be determined in a variety of methods.

For an example, by making the timer to determine the non-presence of the user in a case a camera mounted to a front of the TV set may not capture a watcher, it is possible that the timer comes into operation to count the user unused time period starting from a time the camera fails to capture the watcher. However, a method for measuring the user unused time period are not limited to the embodiment, but a plurality of methods different from the embodiment may be used.

The shifting time period setting unit 814 varies a mode shifting reference time period in which the electric apparatus 70 shifts to a power saving mode (i.e. a sleep mode) and a power off mode, with reference to the electric rate information or the power demand information which varies. In this instance, the shifting time period setting unit 814 may set the mode shifting reference time period varied with time zones such that the electric apparatus 70 shifts from a time zone in which relatively high electric rate is applied, i.e., a time zone in which power demand is relatively high, to a power saving mode within a relatively short user unused time period.

That is, by making the mode shifting reference time period of the electric apparatus 70 short in the time zone in which the electric rate is high, electric rate caused by performance of a function of the electric apparatus 70 which is not used at the present time may be reduced. And, by setting the mode shifting reference time period of the electric apparatus 70 long in the time zone in which the electric rate is the lowest, the user may use the electric apparatus 70 leisurely while the user is engaged with other work. In this instance, the electric rate information is received by the communication unit 810 and stored in the memory 818 in advance, or may be forwarded to the shifting time period setting unit 814 from the communication unit 810, directly.

In the meantime, it is preferable that, in a case of the electric apparatus 70 power off of which is desirable if the user is not present to the electric apparatus, such as the TV set, the lighting apparatus, and the air conditioner, the power is cut off if the presence of the user is not sensed even after management of the electric apparatus 70 in a consistent power saving mode. Therefore, the shifting time period setting unit 814 may set a cut off shifting reference time period to such a particular electric apparatus 70 in which such a particular electric apparatus 70 is shifted from the power saving mode to the power cut off mode.

The control unit 816 compares the user unused time period on the electric apparatus 70 measured by the timer 812 to the mode shifting reference time period set by the shifting time period setting unit 814. As a result of the comparison, if the user unused time period is greater than or equal to the mode shifting reference time period, the control unit 816 generates a control signal and forwards the same to the communication unit 810 for shifting the electric apparatus 70 to the power saving mode. The communication unit 810 forwards the control signal received thus to a relevant electric apparatus 70 such that the electric apparatus 70 is shifted to the power saving mode.

In this instance, in the power saving mode, the electric apparatuses 70 are managed to maintain essential functions for minimizing power consumption. For an example, in a case of the electric apparatuses 70 each having a display window, such as the refrigerator, the washing machine, the air conditioner, and the smart meter, brightness of the display window is minimized or turned off. If the display window is a liquid crystal panel, a back light unit of the panel may be turned off. And, in a case of the TV set and the lighting apparatus, brightness of a screen or illumination is made lower than a general mode, to manage the same in the power saving mode.

In the meantime, the control unit 816 compares the user unused time period on particular electric apparatuses 70 power cut off of which is desirable at the time of user non-presence, such as the TV set, the lighting apparatus, and the air conditioner, to the cut off shifting reference time period set by the shifting time period setting unit 814. As a result of comparison, if the user unused time period is greater than or equal to the cut off shifting reference time period, the control unit 816 forwards a control signal of cutting off power to the electric apparatus 70 to the communication unit 810, and the communication unit 810 forwards the control signal to a relevant electric apparatus 70 to cut off the power.

In the meantime, in the embodiment, the mode shifting reference time period and the cut off shifting reference time period may be set automatically by the shifting time period setting unit 814. However, the power control apparatus 80 may be set to determine the mode shifting reference time period and the cut off reference shifting time period, directly. To do this, the power control apparatus 80 of the embodiment includes an input unit 820 for receiving a user's order on this. The user's order applied through the input unit 820 is forwarded to the shifting time period setting unit 814, and the control unit 816 compares the mode shifting reference time period and the cut off shifting reference time period of a time received from the input unit 820 to the user unused time period on the electric apparatus 70 received from the timer 812, for controlling the electric apparatus 70.

A method for controlling power in accordance with a first exemplary embodiment of the present invention will be described with reference to FIGS. 4 to 7.

Figure 4:
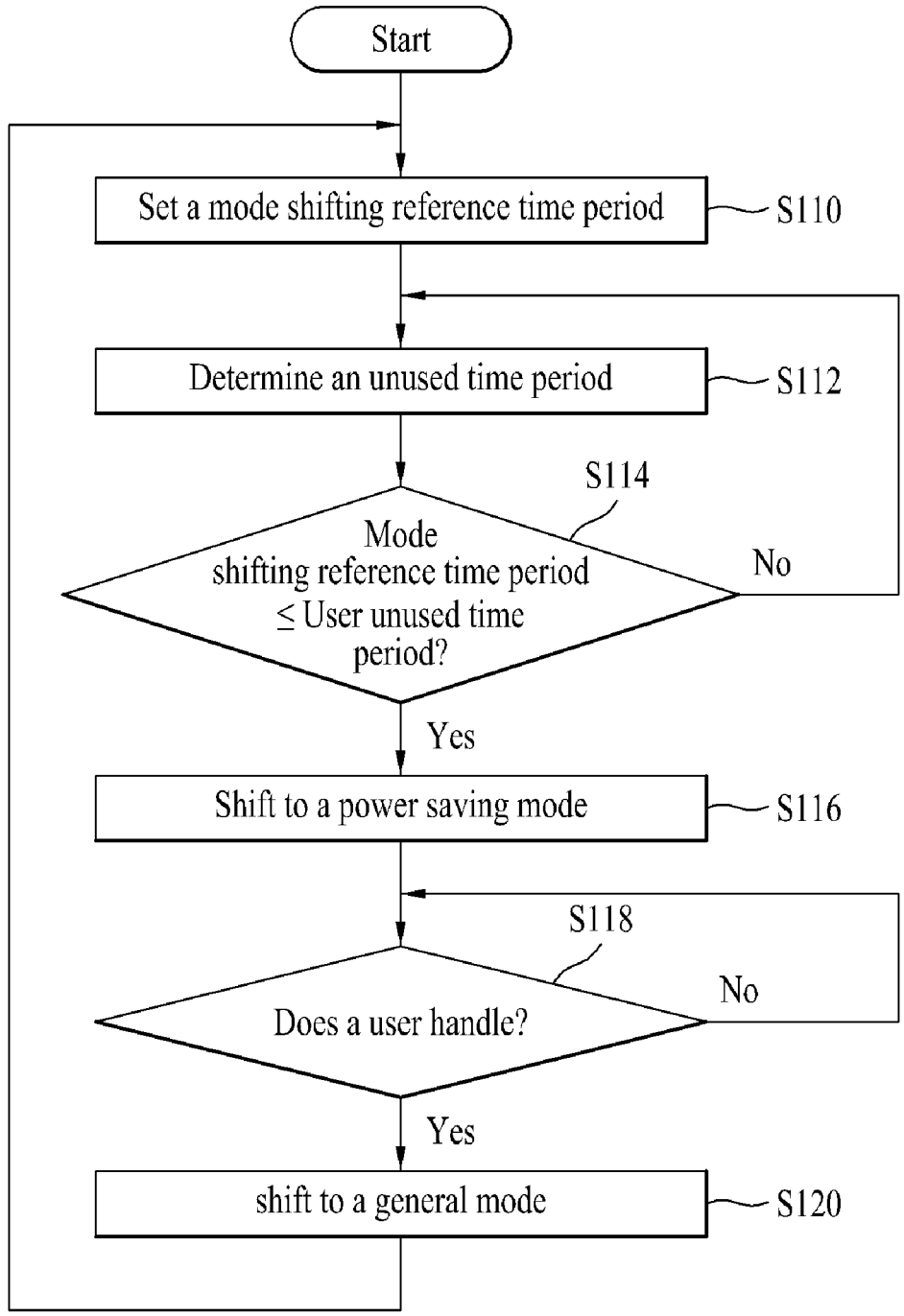
FIG. 4 illustrates a flow chart showing the steps of a method for controlling power in accordance with a first exemplary embodiment of the present invention.

FIG. 4 illustrates a flow chart showing the steps of a method for controlling power in accordance with a first exemplary embodiment of the present invention. In the method for controlling power in accordance with the first exemplary embodiment of the present invention, an electric apparatus which is in operation but the user does not use the electric apparatus is shifted to a power saving mode in a case a time period determined according to electric rate information is passed.

A mode shifting reference time period is varied (S110) for automatic shifting of the electric apparatus to a power saving mode according to electric rate information or a power demand information which varies. In this instance, it is preferable that the mode shifting reference time period is set such that the electric apparatus is shifted to a power saving mode within a relatively short user unused time period in a time zone to which relatively high electric rate is applied, i.e., a time zone having the greatest power demand. And, the setting of the mode shifting reference time period may be made automatically, or by the user.

Next, during operation of the electric apparatus, the user unused time period on the electric apparatus in which the user does not use the electric apparatus is determined (S112). In this instance, the user unused time period may be determined by determining a final handling time of user on the electric apparatus, and calculating a time period passed from the final handling time. For an example, if the electric apparatus is a smart meter having a display window and an input unit for user interface, the user unused time period can be determined by calculating the passed time period from the time the user finally performs control on the smart meter by pressing an input button.

Next, the user unused time period on the electric apparatus is compared to the mode shifting reference time period set thus (S114). As a result of comparison, if the user unused time period is greater than or equal to the mode shifting reference time period, i.e., there is no additional handling of the user during the mode shifting reference time period set in advance, the electric apparatus is controlled such that the electric apparatus is shifted to the power saving mode, such as a sleep mode (S116). In this case, the shifting of the electric apparatus from a general mode to the power saving mode may be informed in advance by using the display window provided to the electric apparatus.

If the user unused time period is less than the mode shifting reference time period, the user unused time period is determined again (S112), and the comparison of the user unused time period to the mode shifting reference time period is repeated (S114).

Then, it is determined (S118) whether there is user's handling after the shifting to the power saving mode (S116) or not, and if there is the user's handling, the electric apparatus is shifted to the general mode again to operate the electric apparatus (S120). And, if there is no user's handling, the electric apparatus is managed in the power saving mode, continuously.

Hereinafter, an example of saving effects of power consumption and electric rate owing to putting the method for controlling power in accordance with the first exemplary embodiment of the present invention into practice will be described. The electric apparatus will be described taking the smart meter as an example.

Figure 5:
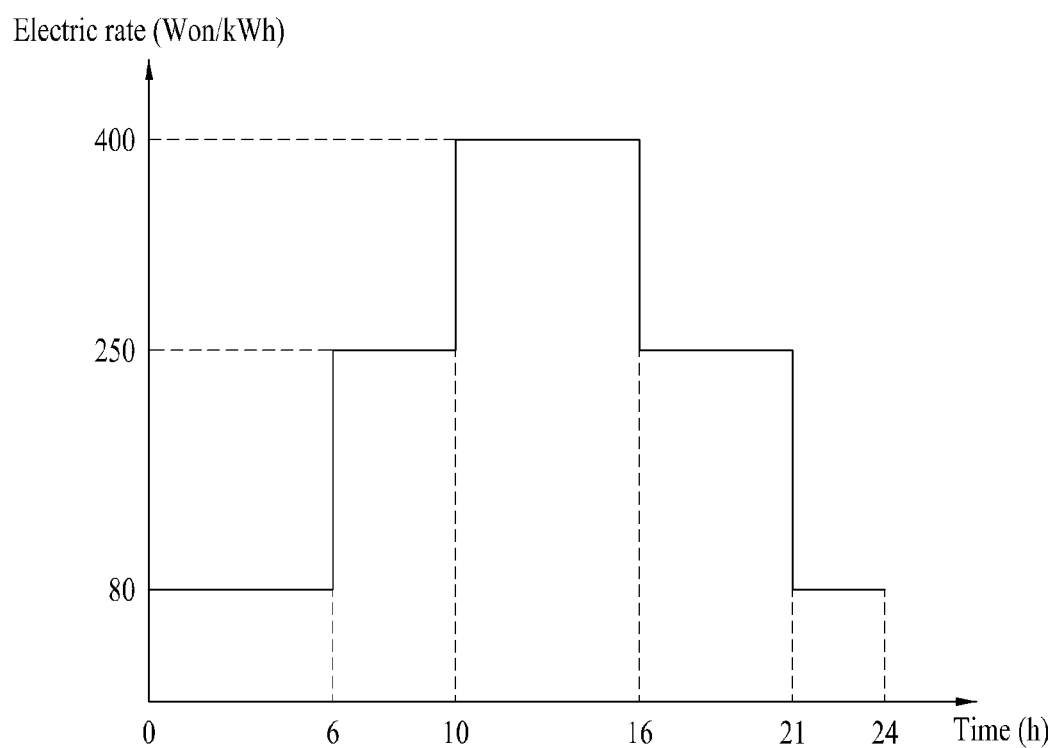
FIG. 5 illustrates a graph showing electric rate information set to vary with time zones as an example.

FIG. 5 illustrates a graph showing electric rates set to vary with time zones as an example, and FIG. 6 illustrates an exemplary table showing a mode shifting reference time period set with reference to electric rate information which varies. As shown in FIGS. 5 and 6, a longest mode shifting reference time period (30 minutes) is set in time zones (from 0 o'clock to 6 o'clock, and from 21 o'clock to 24 o'clock) in which the lowest electric rate is charged in a day. And, a middle range of mode shifting reference time period (15 minutes) is set in time zones (from 6 o'clock to 10 o'clock and from 16 o'clock to 21 o'clock) in which a middle level of electric rate is charged. And, a shortest mode shifting reference time period (5 minutes) is set in a time zone (from 10 o'clock to 16 o'clock) in which the highest electric rate is charged in a day. It is assumed that the smart meter consumes 5.4 Wh in the general mode and 2.4 Wh in the power saving mode.

And, it is also assumed that there is no user's handling on the smart meter from 0 o'clock to 6 o'clock, and one time of handling in the other time zones.

FIG. 7 illustrates a table showing saving effects of power consumption and electric rate based on above assumption. As shown in FIG. 7, as a result of application of the method for controlling power in accordance with the example of the first exemplary embodiment, monthly power consumption of the smart meter is reduced by 1.8225 Kwh from 3.888 Kwh to 2.0655 Kwh with a saving effect of 46.88%, reducing $CO_2$ emission by 0.77 Kg, and the electric rate by 407,475 won with a 46.84% electric rate saving effect.

Though above illustrates the smart meter as an example of the electric apparatus, the power control method of the embodiment is applicable to all electric apparatuses having display windows, such as the computer, the refrigerator, and the washing machine. Particularly, it is preferable that the power control method of the embodiment is applied to the electric apparatus which is required to maintain power supply even if there is no user's handling, such as the smart meter and the refrigerator.

Figure 8:
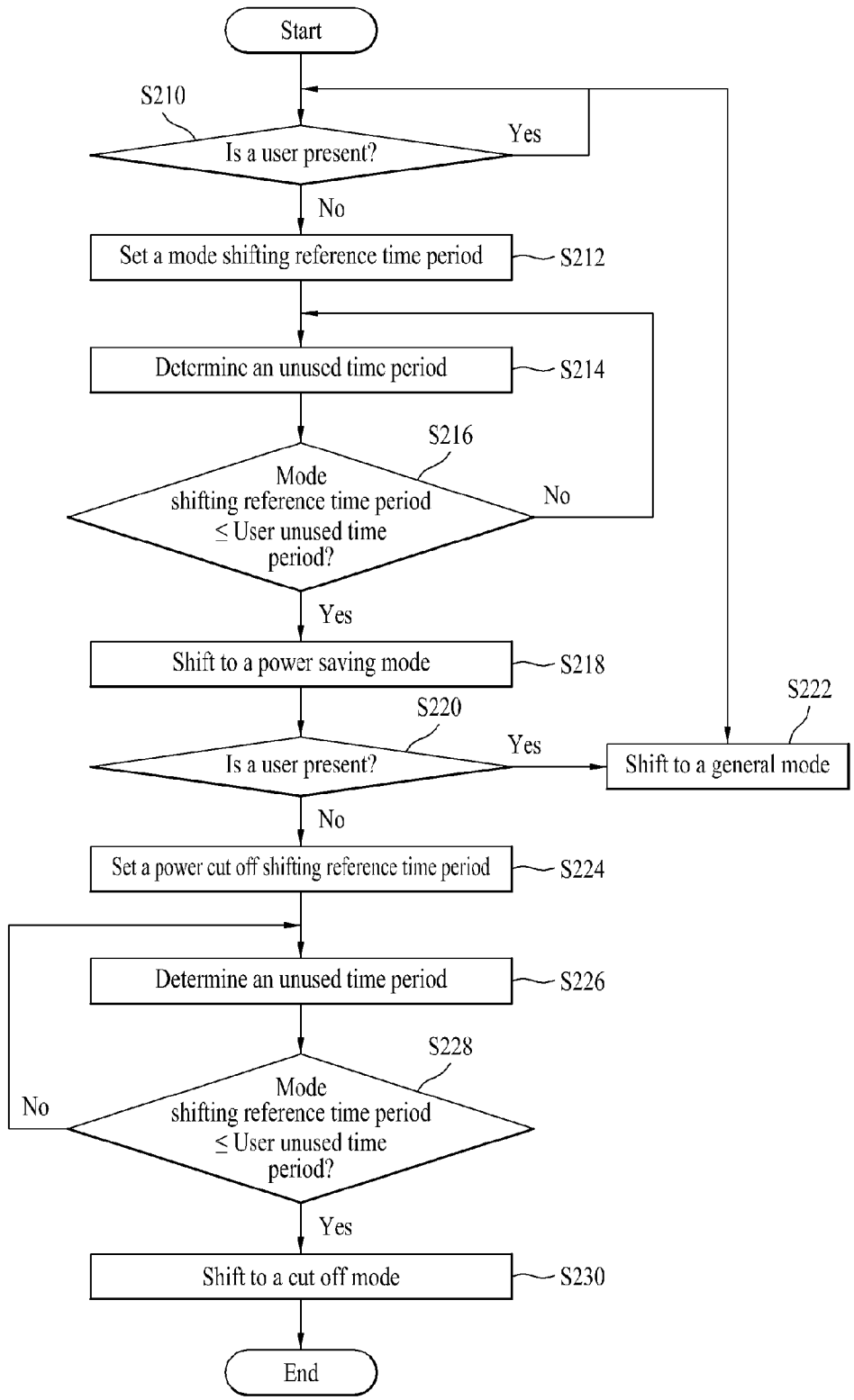
FIG. 8 illustrates a flow chart showing the steps of a method for controlling power in accordance with a second exemplary embodiment of the present invention.

FIG. 8 illustrates a flow chart showing the steps of a method for controlling power in accordance with a second exemplary embodiment of the present invention. The embodiment suggests management of an electric apparatus in a power saving mode like a slip mode firstly, and management of the electric apparatus in a cut off mode in which the power is cut off secondly for reducing power consumption caused by unused electric apparatus, effectively. The embodiment suggests cutting off power to the electric apparatus if it is determined that there is no user's handling or use of the electric apparatus for a long time period. Therefore, it is preferable that the power control method of the embodiment is applied to the electric apparatuses, such as the TV set, the lighting apparatus, the air conditioner, and a digital photo frame which do not require maintaining power supply thereto.

At first, presence of a user to an electric apparatus is determined (S120). By determining the presence of the user to the electric apparatus by using the electric apparatus or a sensor attached to a periphery of the electric apparatus, a final time of use on the electric apparatus is determined. For an example, if the electric apparatus is the TV set, the TV set has a sensor mounted to a front thereof with which the TV set determines whether there is any person watching the TV set at the present time or not.

Next, a mode shifting reference time period is varied (S212), in which the electric apparatus is shifted from a general mode to a power saving mode. In this instance, alike the first embodiment, it is preferable that the mode shifting reference time period is set such that the electric apparatus is shifted to a power saving mode within a relatively short user unused time period in a time zone to which relatively high electric rate is applied. And, the setting of the mode shifting reference time period may be made automatically, or by the user.

Next, the user unused time period on the electric apparatus in which the user does not use the electric apparatus is determined (S216). In this instance, based on a signal from the sensor, the user unused time period may be determined by calculating a passed time period starting from a user non-presence time to the electric apparatus.

Next, the user unused time period on the electric apparatus is compared to the mode shifting reference time period set thus (S216). As a result of comparison, if the user unused time period is greater than or equal to the mode shifting reference time period, i.e., if the user's non-presence to the electric apparatus is consistent in the mode shifting reference time period set in advance, the electric apparatus is controlled to be shifted to the power saving mode (S218). In this case, the shifting of the electric apparatus from a general mode to the power saving mode may be informed in advance by using the display window provided to the electric apparatus.

if the user unused time period is less than the mode shifting reference time period, the user unused time period is determined again (S214), and the comparison of the user unused time period to the mode shifting reference time period is repeated (S216).

Then, user's presence to the electric apparatus is determined (S220) after the shifting of the electric apparatus to the power saving mode (S218), and if the user is present to the electric apparatus, the electric apparatus is shifted to the general mode again to operate the electric apparatus (S222). And, if the user is not present to the electric apparatus, the electric apparatus is managed in the power saving mode continuously, and a cut off shifting reference time period is set for shifting the electric apparatus from the power saving mode to a cut off mode in which power to the electric apparatus is cut off.

Then, the user unused time period is determined again, in which the user does not use the electric apparatus (S226). In this instance, as described before, with reference to a signal from a sensor, an accumulative passed time period is calculated starting from a time of the user's non-presence to the electric apparatus, to determine the user unused time period.

Then, the user unused time period on the electric apparatus is compared to the cut off shifting reference time period set thus (S228). As a result of comparison, if the user unused time period is greater than or equal to the cut off shifting reference time period, i.e., if the user is not present to the electric apparatus for the cut off shifting reference time period set in advance consistently, the electric apparatus is controlled to shift the electric apparatus to the cut off mode (S230). In this case, the shifting of the electric apparatus from the power saving mode to the cut off mode may be informed through the display window provided to the electric apparatus, in advance.

if the user unused time period is less than the mode shifting reference time period, the user unused time period is determined again (S226) while the electric apparatus is managed in the power saving mode, and a process for comparing the user unused time period to the mode shifting reference time period is repeated (S228).

However, since it is preferable that the embodiment is applied to the electric apparatus maintaining of which power is not essential, the mode shifting reference time period and the cut off shifting reference time period may be set very short. Therefore, if the non-presence of the user is sensed, the electric apparatus may be shifted to the power saving mode or the cut off mode at once, as necessary. Also, it is possible to directly shift from the general mode into the cut off mode without shifting into the power saving mode. In these cases, it is preferable that the shifting to the power saving mode, or the cut off mode, is informed through the display window provided to the electric apparatus.

Hereinafter, an example of saving effects of power consumption and electric rate owing to putting the method for controlling power in accordance with the second exemplary embodiment of the present invention into practice will be described. The electric apparatus will be described taking the TV set as an example.

Alike the first embodiment, in the embodiment, it is assumed that electric rate varied with time zones illustrated in FIG. 5 is applied. FIG. 9 illustrates a table showing an example of setting a mode shifting reference time period and a cut off reference time period with reference to electric rate level varied with the time zones.

Referring to FIGS. 5 and 9, a longest mode shifting reference time period (30 minutes) and a longest cut off shifting reference time period (one hour) are set in time zones (from 0 o'clock to 6 o'clock, and from 21 o'clock to 24 o'clock) in which the lowest electric rate is charged within a day, respectively. And, a middle range of a mode shifting reference time period (15 minutes) and a middle range of a cut off shifting reference time period (30 minutes) are set in time zones (from 6 o'clock to 10 o'clock, and from 16 o'clock to 21 o'clock) in which a middle level of electric rate is charged, respectively. And, a shortest mode shifting reference time period (5 minutes) and a shortest cut off shifting reference time period (10 minutes) are set in a time zone (from 10 o'clock to 16 o'clock) in which the highest electric rate is charged within a day.

It is assumed that the TV set consumes 192 Wh in the general mode and 86 Wh in the power saving mode, and does not consume power in the cut off shifting reference time period. And, it is also assumed that there is no user's handling on the TV set from 0 o'clock to 6 o'clock, and one time of handling in the other time zones.

FIG. 10 illustrates a table showing saving effects of power consumption and electric rate based on above assumption. As shown in FIG. 10, as a result of application of the method for controlling power in accordance with the example of the second exemplary embodiment, monthly power consumption of the TV set is reduced by 105.84 Kwh from 188.24 Kwh to 32.4 Kwh with a saving effect of 76.56%, reducing $CO_2$ emission by 44.88 Kg, and the electric rate by 23,652 Won with a 76.17% electric rate saving effect, accordingly.

Though above illustrates the TV set as an example of the electric apparatus, the power control method of the embodiment is applicable to all electric apparatuses having display windows, such as the computer, the refrigerator, and the washing machine. Particularly, it is preferable that the power control method of the embodiment is applied to the electric apparatuses cutting off of power to which is desirable in a case of the non-presence of the user to the electric apparatus, such as the TV set, the lighting apparatus, the air conditioner, and the digital photo frame.

As has been described, the power control apparatus and the power control method of the present invention have the following advantages.

Unnecessary power consumption by the electric apparatuses may be prevented. And, the refraining of power consumption at time zones in which a high electric rate is charged permits the user to save the electric charge. Moreover, the suppressing of the power consumption in time zones in which the power consumption is high permits the power provider to reduce additional installation of power facilities.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. An electric apparatus using electric power, comprising:
   a communication unit configured to receive power information including electric rate information or power demand information on each of time zones from an outside of the electric apparatus;
   a timer configured to determine a user unused time period which is a time period passed from a user's final handling time on the electric apparatus or final user presence time to the electric apparatus detected by a sensor during a normal operation mode of the electric apparatus;
   a shifting time period setting unit configured to vary a mode shifting reference time period with reference to the electric rate information or the power demand information, wherein the mode shifting reference time period in the time zone in which the electric rate is a high rate is shorter than the mode shifting reference time period in the time zone in which the electric rate is a middle rate, and wherein the mode shifting reference time period in the time zone in which the electric rate is the middle rate is shorter than the mode shifting reference time period in the time zone in which the electric rate is a low rate; and
   a control unit configured to shift an operation mode of the electric apparatus from the normal operation mode to a power saving mode for enabling the electric apparatus to use less power than the normal operation mode when the user unused time period is greater than or equal to the mode shifting reference time period.

2. The electric apparatus of claim 1, further comprising a memory configured to receive the power information from the communication unit and storing the power information therein.

3. The electric apparatus of claim 1, wherein the electric apparatus includes a smart meter, a computer, a refrigerator, or a washing machine.

4. The electric apparatus of claim 1, wherein the electric apparatus includes a TV set, a lighting apparatus, or an air conditioner.

5. The electric apparatus of claim 1, wherein the electric rate information includes a first electric rate for a first time zone and a second electric rate for a second time zone,
wherein the shifting time period setting unit is further configured to set a first mode shifting reference time period for the first time zone and a second electric mode shifting reference time period for the second time zone, the first mode shifting reference time period being set to be shorter than the second mode shifting reference time period in response to determining that the first electric rate is higher than the second electric rate, and
wherein the control unit configured to shift the operation mode of the electric apparatus from the normal operation mode to the power saving mode in response to determining that the user unused time period is greater than or equal to the first mode shifting reference time period during the first time zone or the second mode shifting reference time period during the second time zone.

6. A method of controlling power, comprising:
receiving power information including electric rate information or power demand information on each of time zones from an outside of the electric apparatus;
determining a user unused time period which is a time period passed from a user's final handling time on the electric apparatus or final user presence time to the electric apparatus detected by a sensor during a normal operation mode of the electric apparatus;
variably setting a mode shifting reference time period according to the electric rate information or the power demand information, wherein the mode shifting reference time period in the time zone in which the electric rate is a high rate is shorter than the mode shifting reference time period in the time zone in which the electric rate is a middle rate, and wherein the mode shifting reference time period in the time zone in which the electric rate is the middle rate is shorter than the mode shifting reference time period in the time zone in which the electric rate is a low rate;
comparing the user unused time period and the mode shifting reference time period; and
shifting an operation mode of the electric apparatus from the normal operation mode to a power saving mode when the user unused time period is greater than or equal to the mode shifting reference time period.

7. The method of claim 6, wherein the step of variably setting the mode shifting reference time period includes:
receiving a user's order on setting of the mode shifting reference time period in which the electric apparatus is to be shifted to the power saving mode, and
variably setting the mode shifting reference time period according to the user's order.

8. The method of claim 6, wherein the electric apparatus includes a smart meter, a computer, a refrigerator, or a washing machine.

9. The method of claim 6, wherein the electric apparatus includes a TV set, a lighting apparatus, or an air conditioner.

10. The method of claim 6, wherein the electric rate information includes a first electric rate for a first time zone and a second electric rate for a second time zone,
wherein the variably setting the mode shifting reference time period further includes setting a first mode shifting reference time period for the first time zone and a second electric mode shifting reference time period for the second time zone, the first mode shifting reference time period being set to be shorter than the second mode shifting reference time period in response to determining that the first electric rate is higher than the second electric rate, and
wherein the shifting the operation mode includes shifting the operation mode of the electric apparatus from the normal operation mode to the power saving mode in response to determining that the user unused time period is greater than or equal to the first mode shifting reference time period during the first time zone or the second mode shifting reference time period during the second time zone.

* * * * *